(12) United States Patent
Zepka

(10) Patent No.: US 12,511,675 B2
(45) Date of Patent: Dec. 30, 2025

(54) SYSTEM AND METHOD OF TRADING GOODS AND SERVICES

(71) Applicant: Rodger H. Zepka, Bogota, NJ (US)

(72) Inventor: Rodger H. Zepka, Bogota, NJ (US)

( * ) Notice: Subject to any disclaimer, the term of this patent is extended or adjusted under 35 U.S.C. 154(b) by 0 days.

(21) Appl. No.: 19/052,470

(22) Filed: Feb. 13, 2025

(65) Prior Publication Data

US 2025/0182177 A1 Jun. 5, 2025

Related U.S. Application Data

(63) Continuation-in-part of application No. 18/677,689, filed on May 29, 2024, now abandoned, which is a
(Continued)

(51) Int. Cl.
*G06Q 30/06* (2023.01)
*G06Q 30/0601* (2023.01)
(Continued)

(52) U.S. Cl.
CPC ..... *G06Q 30/0601* (2013.01); *G06Q 30/0609* (2013.01); *G06Q 30/0611* (2013.01);
(Continued)

(58) Field of Classification Search
CPC .......... G06Q 30/0601; G06Q 30/0609; G06Q 30/0615; G06Q 30/0611; G06Q 40/0611
See application file for complete search history.

(56) References Cited

U.S. PATENT DOCUMENTS 7,096,193 B1   8/2006  Beaudoin
7,412,042 B2   8/2008  Henry
(Continued)

FOREIGN PATENT DOCUMENTS

CN    110298518 A  * 10/2019  ........... G06Q 50/265
DE    202009001676 U1 *  7/2010  ............. B65B 35/04
(Continued)

OTHER PUBLICATIONS

Scholz, Michael; Pfeiffer, Jella; Rothlauf, Franz; "Using PageRank for non-personalized default rankings in dynamic markets", . European Journal of Operational Research260.1: 388-401. Elsevier Science BV. (Jul. 1, 2017) retrieved from Dialog on Mar. 25, 2025 (Year: 2017).*

*Primary Examiner* — Yogesh C Garg
(74) *Attorney, Agent, or Firm* — William J Connelly, III; Kelley Kronenberg

(57) ABSTRACT

Disclosed is a system and method for trading goods and services comprising a processor and a non-transitory computer-readable storage medium storing instructions executable by the processors. The processor assigns both a consumer and service and/or goods provider an anonymous code for purposes of anonymity during the purchase process. The processor further enables the system to perform operations comprising, filtering a first set of registration details associated with registered service providers to generate a list of filtered service providers, receiving quotations associated with the requested goods and/or the service; sorting purchase prices, and generating a first notification when the consumer selects a service provider. Prior to consummation of the purchase, the anonymous codes are converted to provide the true identities of the consumer and provider to effectuate the preparation of a sales agreement and payment of the requested goods and/or service to stimulate and increase commerce.

20 Claims, 5 Drawing Sheets

Related U.S. Application Data continuation-in-part of application No. 17/828,460, filed on May 31, 2022, now abandoned.

(51) Int. Cl.
*G06Q 40/03* (2023.01)
*G06Q 40/04* (2012.01)

(52) U.S. Cl.
CPC ......... *G06Q 30/0615* (2013.01); *G06Q 40/03* (2023.01); *G06Q 40/04* (2013.01)

(56) References Cited

U.S. PATENT DOCUMENTS

| | | | |
|---|---|---|---|
| 7,593,884 B2* | 9/2009 | Rothman | G06Q 40/04 705/37 |
| 9,984,401 B2 | 5/2018 | Taira | |
| 10,565,639 B1 | 2/2020 | Ghamsari | |
| 2007/0203821 A1 | 8/2007 | DuFour | |
| 2008/0126115 A1 | 5/2008 | Bennett | |
| 2009/0313121 A1* | 12/2009 | Post | G06Q 30/0255 705/14.53 |
| 2014/0136443 A1* | 5/2014 | Kinsey, II | G06Q 10/1095 705/347 |
| 2014/0330619 A1 | 11/2014 | Hatanian | |
| 2017/0337610 A1 | 11/2017 | Beguesse | |
| 2020/0005380 A1 | 1/2020 | Howard | |
| 2020/0104892 A1 | 4/2020 | Aral | |

FOREIGN PATENT DOCUMENTS

| | | | |
|---|---|---|---|
| KR | 100631470 B1 * | 10/2006 | ............. G06Q 10/08 |
| WO | WO-0173665 A1 * | 10/2001 | ............. G06Q 30/08 |
| WO | 2019125426 A1 | 6/2019 | |

* cited by examiner

SYSTEM AND METHOD OF TRADING GOODS AND SERVICES

CROSS REFERENCE TO RELATED APPLICATION

This application is a continuation in part of U.S. application Ser. No. 18/677,689 filed on May 29, 2024 and a continuation in part of U.S. application Ser. No. 17/828,460 filed on May 31, 2022, and thereby claims benefit and priority to U.S. application Ser. no. 17/828,460 and benefit and priority to U.S. Provisional Patent Application Ser. No. 63/252,981, filed Oct. 6, 2021, entitled, "SYSTEM AND METHOD OF TRADING GOODS AND SERVICES" which is incorporated herein by reference in its entirety.

FIELD OF INVENTION

Embodiments disclosed herein relate, in general, to an electronic (e)-commerce platform, and more particularly, to a system and method of trading goods and services on the e-commerce platform.

BACKGROUND

An electronic (e)-commerce platform refers to an e-commerce website and/or an application to connect sellers with buyers. With the advent of technology, businesses often prefer to use the e-commerce platforms to reach the buyers who desire to buy their goods or services. The e-commerce platforms offer several advantages such as, providing buyers a convenient means of comparing products and prices and simplifying a purchasing process, which will often lead to future purchases and a general trust between a consumer and e-commerce platforms.

In a typical e-commerce platform, a website or an application is provided where external users such as, the buyers and the sellers can buy and sell goods and/or services in an online mode over the Internet. The buyers and the sellers can communicate with each other through a communication network, with limited access due to a network security system such as a firewall. The firewall is a software designed to limit an unauthorized access to a database, depending on passwords or pre-coded access privileges. However, if buyers need to search for specific goods or services and desire to perform price comparison of the goods or services prior to making a purchase, multiple rounds of inquiries are often required leading to a time-consuming process requiring multiple connections. Moreover, in some of the typical e-commerce platforms, sellers are under marketing pressure to repetitively send reorder reminders or new notifications in a form of emails, texts, and so forth to buyers that are of little or no interest to many of their buyers.

Further, various systems are available, which provide e-commerce platforms to enable buyers and sellers to purchase a variety of goods and services. However, to purchase goods and services using these platforms, buyers and sellers need to generate profiles that are visible to each other during the purchase process which creates a problem of non-anonymity. The problem of non-anonymity refers to where identities of the buyers and sellers remain non-anonymous throughout the purchasing process.

Therefore, there is a need for an improved system that enables sellers to market goods and services in the online mode and permit buyers to conduct an online defined, identifiable and focused search for the purposes of buying or leasing goods and/or services anonymously.

SUMMARY

Embodiments in accordance with the present invention provide a system for purchasing, leasing and/or trading of goods and services. The system comprises a processor and a non-transitory computer-readable storage medium to store instructions executable by the processor to cause the system to perform operations comprising; filtering a first set of registration details associated with registered service providers to generate a list of filtered service providers based on requested goods and/or services by a consumer, receiving pricing quotations associated with the requested goods and/or the services from the lists of filtered service providers; sorting the final purchase or leasing prices, also referred to as the out the door purchase and/or lease price, mentioned in the corresponding price quotations in one of, an increasing order and a decreasing order; generating a first notification when the consumer selects a service provider from the list of filtered service providers such that the selected service provider is enabled to initiate a first request based on the first notification; and transmitting a real identity of the consumer to a service provider device associated to the selected service provider such that upon revealing the real identity of the selected service provider and the consumer, a payment for the requested goods and/or service is initiated within a pre-set time frame. In other embodiments of the present invention, the corresponding price quotations may also be sorted geographically. For the purposes of clarity, the terms "goods providers" and "services providers" may be interchangeably referred to as "providers."

Embodiments in accordance with the present invention further provide a system for purchasing, leasing and/or trading goods and services. The system comprises a processor, a non-transitory computer-readable storage medium to store instructions executable by the processor to cause the system to perform operations comprising; filtering a first set of registration details associated with registered goods and or services providers to generate a list of filtered goods and services providers, based on specified goods and/or services requested by a consumer; receiving price quotations associated with the requested goods and/or services from the lists of filtered service providers; sorting the final purchase prices and/or leasing costs mentioned in the corresponding quotations in one of, an increasing order and a decreasing order; generating a first notification when the consumer selects a goods and/or service provider from the list of filtered service providers such that the selected goods and/or service provider is enabled to initiate a first request based on the first notification; wherein the first request comprises a request of credit and/or financial information selected from a credit application and/or cash flow statement of the consumer, a balance sheet of the consumer, or a combination thereof; generating an agreement having a plurality of details when the credit and/or financial information is disclosed by the consumer and approved by the selected provider; and transmitting a real identity of the consumer to a provider device associated to the selected service provider such that upon revealing the real identity of the selected service provider and the consumer, a payment for the requested goods and/or service is initiated within a pre-set time frame. For purposes of clarity, the terms "goods providers" and "services providers" may be interchangeably referred to as "providers."

Embodiments in accordance with the present invention further provide a computer implemented method for facilitating anonymous buying and/or leasing of goods and/or services. In an embodiment of the present invention, the method comprises the steps of filtering, by way of a processor, a first set of registration details associated with a registered provider to generate a list of filtered providers based on the requested goods and/or the service by a consumer; receiving, by way of the processor, quotations associated with the requested goods and/or the service from the list of filtered providers; sorting, by way of the processor, final purchase and leased prices mentioned in the corresponding quotations of the requested goods and/or services in one of, an increasing order and a decreasing order; generating, by way of the processor, a first notification when the consumer selects a provider from the list of filtered providers such that the selected provider is enabled to initiate a first request based on the first notification; and transmitting, by way of the processor, a real identity of the consumer to a provider device associated to the selected provider such that upon revealing the real identity of the selected provider and the consumer, a payment or deposit for the requested goods and/or service is initiated within a pre-set time frame.

Embodiments of the present invention may provide several advantages depending on its configuration. The several advantages include improvements to the computing system. The computing system will operate more efficiently and accurately store information more efficiently. Embodiments of the present invention may provide a system comprising an e-commerce application to enable a provider to market goods and/or services to a consumer through an e-commerce platform. Further, embodiments of the present invention may provide a system that enables a consumer to buy, lease or trade goods and/or services by conducting an online search that includes a total all-inclusive purchase price or leasing cost of the goods and/or services within a specified geographic location. Additionally, embodiments of the present invention may provide a level of anonymity for a consumer and goods and services provider while purchasing goods and/or services which, in turn, reduces contact inundation, trepidation and stress associated with the buying, leasing and/or selling process. Embodiments of the present invention are directed to a system where both goods and services providers and consumers are assigned an anonymous identity code throughout the purchasing or leasing process until the final purchase is decided and/or made, which in turn avoids a frequent marketing pressure, return calls, texts, emails, and the like which may prohibit a sale and or commerce from occurring.

Further, embodiments of the present invention may provide a system that provides a fully online process of purchasing, leasing, and trading goods and services, thereby eliminating hours of in-person interaction. As such, the computing system is able to more efficiently provide a processing of purchasing, leasing, and trading goods and services than previous computing systems therefore enhancing commerce.

These and other advantages will be apparent from the present application of the embodiments described herein.

The preceding is a simplified summary to provide an understanding of some embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below to stimulate commerce.

BRIEF DESCRIPTION OF THE DRAWINGS

The foregoing and other aspects of the embodiments disclosed herein are best understood from the following detailed description when read in connection with the accompanying drawings. For the purpose of illustrating the embodiments disclosed herein, there is shown in the drawings embodiments that are presently preferred, it being understood, however, that the embodiments disclosed herein are not limited to the specific instrumentalities disclosed. Included in the drawings are the following figures.

Figure 1:
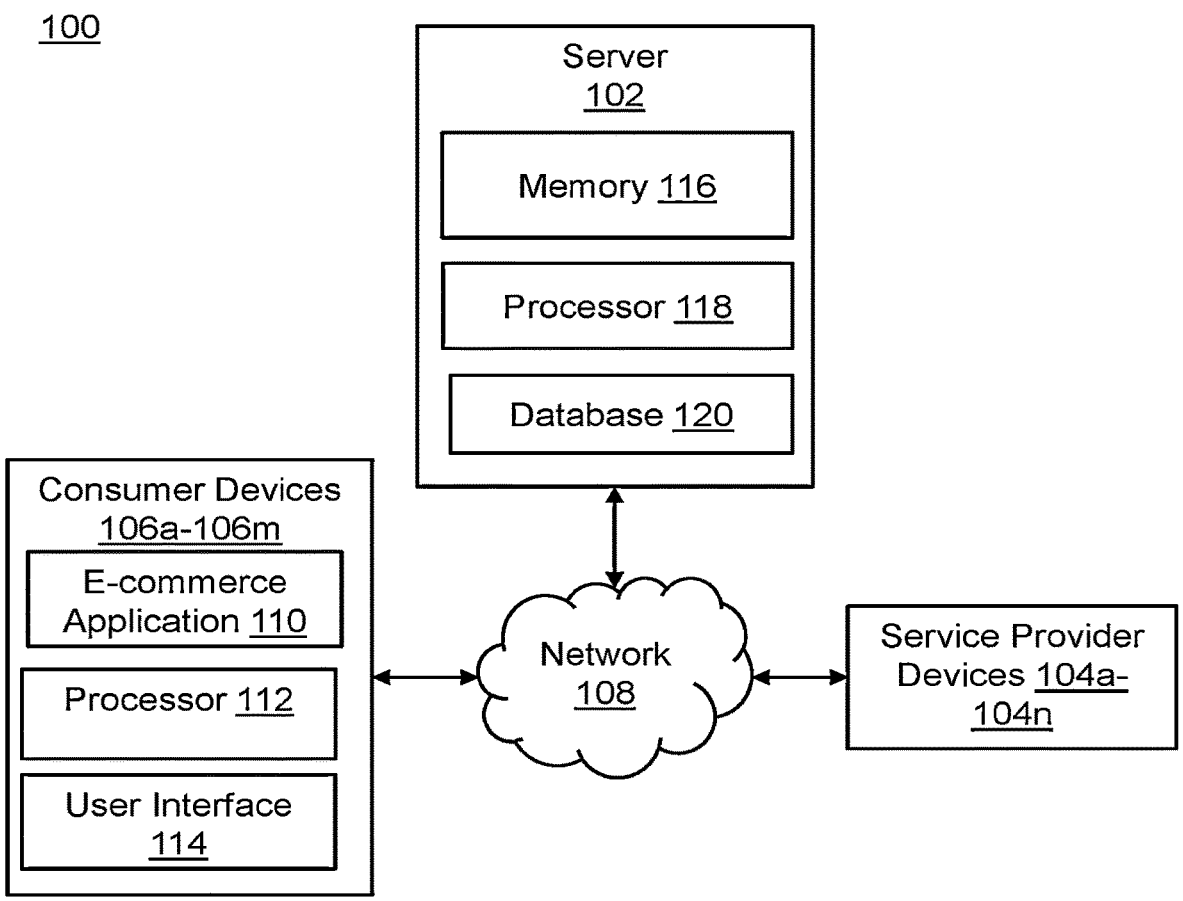
FIG. 1 illustrates a block diagram of a system for purchasing goods and services, according to an embodiment of the present invention.

While embodiments of the present invention are described herein by way of example using several illustrative drawings, those skilled in the art will recognize the present invention is not limited to the embodiments or drawings described. It should be understood the drawings and the detailed description thereto are not intended to limit the present invention to the particular form disclosed, but to the contrary, the present invention is to cover all modification, equivalents and alternatives falling within the spirit and scope of embodiments of the present invention as defined by the appended claims.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present invention will be described below in conjunction with an exemplary system for trading goods and services. Embodiments of the present invention are not limited to any particular type of a system for trading goods and services. Those skilled in the art will recognize the disclosed techniques may be used in any system for trading goods and services.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

FIG. 1 illustrates a block diagram of a system 100 for purchasing goods and services, according to an embodiment of the present invention. The goods may be, but not limited to, automobiles, cell phones, clothes, footwears, electronic items, medications, mortgages and the like. In a preferred embodiment of the present invention, the goods may be automobiles. Embodiments of the present invention are intended to include or otherwise cover any type of the goods, without deviating from a scope of the present invention. In some embodiments of the present invention, the automobiles may be, but not limited to, cars, trucks, motorbikes, boats, autos, and the like. Embodiments of the present invention are intended to include or otherwise cover any type of the automobiles, without deviating from the scope of the present invention. Further, the services may be, but not limited to, beauty services, grooming services, home cleaning services, fitness services, and the like. Embodiments of the present invention are intended to include or otherwise cover any type of the services that may be beneficial for consumers. The system 100 may be configured to enable a service provider (hereinafter collectively referred to and designated as the "provider") to market the goods and/or the services to consumers (hereinafter individually referred to and designated as "the consumer") through a server 102. In an embodiment of the present invention, the system 100 may be further configured to enable the consumer to conduct an online search on the server 102 to buy and/or lease the defined goods and/or the defined services. The system 100 may comprise one or more service provider devices 104a-104n (hereinafter individually referred to as the "service provider device" 104) and one or more consumer devices 106a-106m (hereinafter individually referred to as the "consumer device" 106) communicating by way of the server 102. Further, the server 102, the service provider device 104, and the consumer device 106 may be connected through a network 108.

The exemplary embodiments of the invention can include atomization of data. Atomicity or atomization can be a more efficient way of organizing and storing data. In some embodiments, there can be four degrees of atomization. The four degrees of atomization can be atomized data, in which any data attribute or fact can be fully atomized such that it is further irreducible without the loss of meaning or context of data. In addition, data within a common subject area can be placed within a cluster in relation to that subject area. Query operators can also be used to represent various data as well. The various ways in which atomization of the data can occur can be illustrated in the description below. Various items such as the set of registration details, quotation prices, actual prices of goods and services, and availability of the goods and services can be atomized and identified in at least one embodiment. According to embodiments of the present invention, the network 108 may be a Wireless Local Area Network (WLAN) of a place such as, but not limited to, a house of the consumer. According to embodiments of the present invention, the network 108 may be a data network such as, but not limited to, the Internet, a Local Area Network (LAN), a Wide Area Network (WAN), a Metropolitan Area Network (MAN), and so forth. Embodiments of the present invention are intended to include or otherwise cover any type of the data network. In some embodiments of the present invention, the network 108 may be a wireless network, such as, but not limited to, a cellular network and may employ various technologies including an Enhanced Data Rates for Global Evolution (EDGE), a General Packet Radio Service (GPRS), and so forth. Embodiments of the present invention are intended to include or otherwise cover any type of wireless network. According to an embodiment of the present invention, the server 102, the service provider device 104, and the consumer device 106 may be configured to communicate with each other by one or more communication mediums connected to the network 108. The communication mediums may be for example, but not limited to, a coaxial cable, a copper wire, a fiber optic, a wire that comprise a system bus coupled to a processor of a computing device, and so forth. Embodiments of the present invention are intended to include or otherwise cover any type of the communication medium providing a process to stimulate commerce.

The service provider device 104 may be a device used by a corresponding service provider for marketing and sales of the goods and/or the services. Further, the service provider device 104 may be used by the corresponding service provider to transmit one or more quotations (hereinafter referred to as the "quotations") corresponding to a goods request and/or a service request received from the consumer. The service provider device 104 may be, but not limited to, a mobile device, a smart phone, a tablet computer, a portable computer, a laptop computer, a desktop computer, a smart device, and so forth. Embodiments of the present invention are intended to include or otherwise cover any type of service provider device 104. In an embodiment of the present invention, the service providers may be able to perform marketing of the goods and/or the services by using an e-commerce application (not shown) that may be installed in the service provider device 104.

Specifically, the quotations may comprise one or more details such as, but not limited to, an out the door or final, all-inclusive buying price of the requested goods and/or the services, an out the door or final all-inclusive leasing cost of the requested goods, an availability of the requested goods and/or the services in a geographical location provided by the consumer, discounts, terms and conditions, and so forth. In various embodiments, the buying price of the requested goods and services can be atomized and identified. In addition, the availability of the requested goods and services can be atomized. Both can be stored in separate clusters of data within the computing device. Further, within the clusters, query expressions can represent the cluster of the buying price of requested goods and services. A query expression or expressions can also represent the availability of the services. Embodiments of the present invention are intended to include or otherwise cover any type of the details that the consumer requires prior to finalize a deal for the requested goods and/or the services. In an embodiment of the present invention, the discounts may be applicable for the consumer such as, but not limited, a first responder, a military person, a college student, a graduate, and so forth. Further, the terms and conditions may include, but not limited to, terms of a payment, prices, taxes, delays in delivery, monthly down payment, return policy, and so forth. In such embodiment of the present invention, the terms of payment may include, but not limited to, a deposit, a condition of advance payment, a condition of immediate payment, number of installment payments, a list of accepted payment methods, a period of time in which the consumer needs to pay a complete amount, and so forth. The computing system can provide advantages not present in other computing systems. The computing system can be designed to more efficiently identify registered service providers in comparison to other computing systems and/or process to enhance commerce. In particular, the computing system may identify the requested goods and services from registered service providers that are actually available to expediate the computational process of providing a quotation to a consumer. The computing system can disregard goods and services from registered service providers that are not available. The computational system will also more efficiently store information on the registered service providers based on attributes, or the type of product that the service providers are providing. As such, the pertinent registered service provider can be located more efficiently by the computing system in comparison to other computing systems. Further, quotations can be sorted more efficiently by the computing system in comparison to other computing system. The computing system can identify a sorting technique that can produce the desired quotation more efficiently, and use that sorting technique to provide quotations to consumers. The computing system can identify which sorting technique can produce the most computational efficient result, and thereby incorporate the sorting technique during the computational process. The various sorting techniques can be atomized as well. The sorting techniques can also be stored within a cluster of data and be represented by a Query expression.

The consumer device 106 may be a device used by the consumer to initiate the goods and/or service request, in an embodiment of the present invention. Further, the consumer device 106 may be used by the consumer to receive data such as, but not limited to, quotations from the corresponding service providers, according to embodiments of the present invention. The potential quotations and the series of quotations that may be provided can also be atomized and stored in a data cluster based on the subject area of quotations. A query expression can also represent the entire set of quotations for the goods and services. The consumer device 106 may be for example, but not limited to, a mobile device, smart phone, tablet computer, portable computer, laptop computer, desktop computer, smart device, and so forth. Embodiments are intended to include or otherwise cover any type of consumer device 106. Further, the consumer device 106, as may be readily appreciated by a person skilled in the art, is merely intended to illustrate and not to limit what may encompass the consumer device 106, such as, but not limited to, an instant messaging sending device, a Short Message Service (SMS) transmitting device, and/or other messaging devices that may include, but not limited to, a text, graphics, symbols and/or other identifiable communications. In an embodiment of the present invention, the consumer device 106 may be a multipurpose device, such that an operation in accordance with the present system is merely one of many (e.g., two or more) features that may be provided by the consumer device 106.

According to an embodiment of the present invention, the consumer device 106 may comprise software applications such as, but not limited to, a navigation application, a camera application, a media player application, a social networking application, and the like. In a preferred embodiment of the present invention, the consumer device 106 may comprise an e-commerce application 110 that may be a computer readable program installed on the consumer device 106 for executing functions associated with the system 100 on the consumer device 106. Further, the consumer may login into the system 100 through the e-commerce application 110 by providing login details such as, but not limited to, a consumer identifier, a passcode, and so forth. Embodiments of the present invention are intended to include or otherwise cover any type of the login details that may be associated with the consumer. Upon login into the system 100, the consumer may input the goods request and/or the service request onto the system 100 by using the e-commerce application 110. In another embodiment of the present invention, the consumer may login into the system 100 through a web browser by providing the login details. In such embodiment of the present invention, the consumer may input the goods request and/or the service request onto the system 100 through the web browser upon login into the system 100.

The consumer device 106 may further comprise a processor 112 and a user interface 114. The processor 112 may be configured to receive and/or transmit data associated with the system 100 over the network 108. Further, the processor 112 may be configured to process the data associated with the system 100. According to embodiments of the present invention, the processor 112 may include, but not limited to, a Programmable Logic Control unit (PLC), a microcontroller, a microprocessor, a computing device, a development board, and so forth. Embodiments of the present invention are intended to include or otherwise cover any type of processor 112.

The user interface 114 may be configured to enable the consumer to interact with the e-commerce application 110 installed within the consumer device 106. The user interface 114 may be further configured to display output data associated with the system 100. The user interface 114 may include, but not limited to, a digital display, a touch screen display, a graphical user interface to include an AI interface. Embodiments of the present invention are intended to include or otherwise cover any type of user interface 114. Similarly, the service provider device 104 may comprise the e-commerce application 110, a processor (not shown), and a user interface (not shown) that may be functionally similar to the processor 112, and the user interface 114 of the consumer device 106.

The server 102 may be a network of computers, a software framework, or a combination thereof, that may provide a generalized approach to create the server implementation. Examples of the server 102 may be, but not limited to, personal computers, laptops, mini-computers, mainframe computers, any non-transient and tangible machine that can execute a machine-readable code, cloud-based servers, distributed server networks, or a network of computer systems. The server 102 may be realized through various web-based technologies such as, but not limited to, a Java web-framework, a .NET framework, a Personal Home Page (PHP) framework, or any web-application framework. The server 102 may be maintained by a goods and/services provider authority or a third-party entity that facilitates goods and/or services providing operations of the system 100. The server 102 may include one or more memories of which a memory 116 is shown and one or more processors of which a processor 118 is shown in FIG. 1.

The memory 116 may be a non-transitory computer-readable storage medium that may be configured to store computer executable instructions that can be executed by the processor 118 for controlling the operations of the system 100. The memory 116 may be, but not limited to, a Random-Access Memory device, a Read Only Memory Device, a flash memory, and so forth. Embodiments of the present invention are intended to include or otherwise cover any type of memory 116. The memory 116 can assist with storing the various clusters of data with respect to the quotations of the goods and services, the actual prices of the goods and services, and the availability of the goods and services. Further, the processor 118 may be coupled to the memory 116 such that the processor 118 executes the computer executable instructions to perform the operations associated with the system 100. The processor 118 may be, but not limited to, the Programmable Logic Control unit (PLC), the microcontroller, the microprocessor, the computing device, the development board, and so forth. Embodiments of the present invention are intended to include or otherwise cover any type of processor 118. Further, components of the processor 118 will be explained in detail in conjunction with FIG. 2.

As illustrated, the server 102 may further comprise the database 120 that may be configured to store the data associated with the system 100. In some embodiments of the present invention, the server 102 may comprise multiple databases (not shown) to store the data associated with the system 100. The database 120 may be, but not limited to, a centralized database, a distributed database, a personal database, an end-user database, a commercial database, a Structured Query Language (SQL) database, a NoSQL database, an operational database, a relational database, a cloud database, an object-oriented database, a graph database, AI database, and so forth. Embodiments of the present invention are intended to include or otherwise cover any type of database 120 capable of data storage and retrieval. The atomization of the various quotations, prices, and availability of the goods and services can be stored within the database 120 in one or more embodiments. The data clusters of the quotations, the actual prices, and the availability of the goods and services can be stored within the database in various embodiments.

Figure 2:
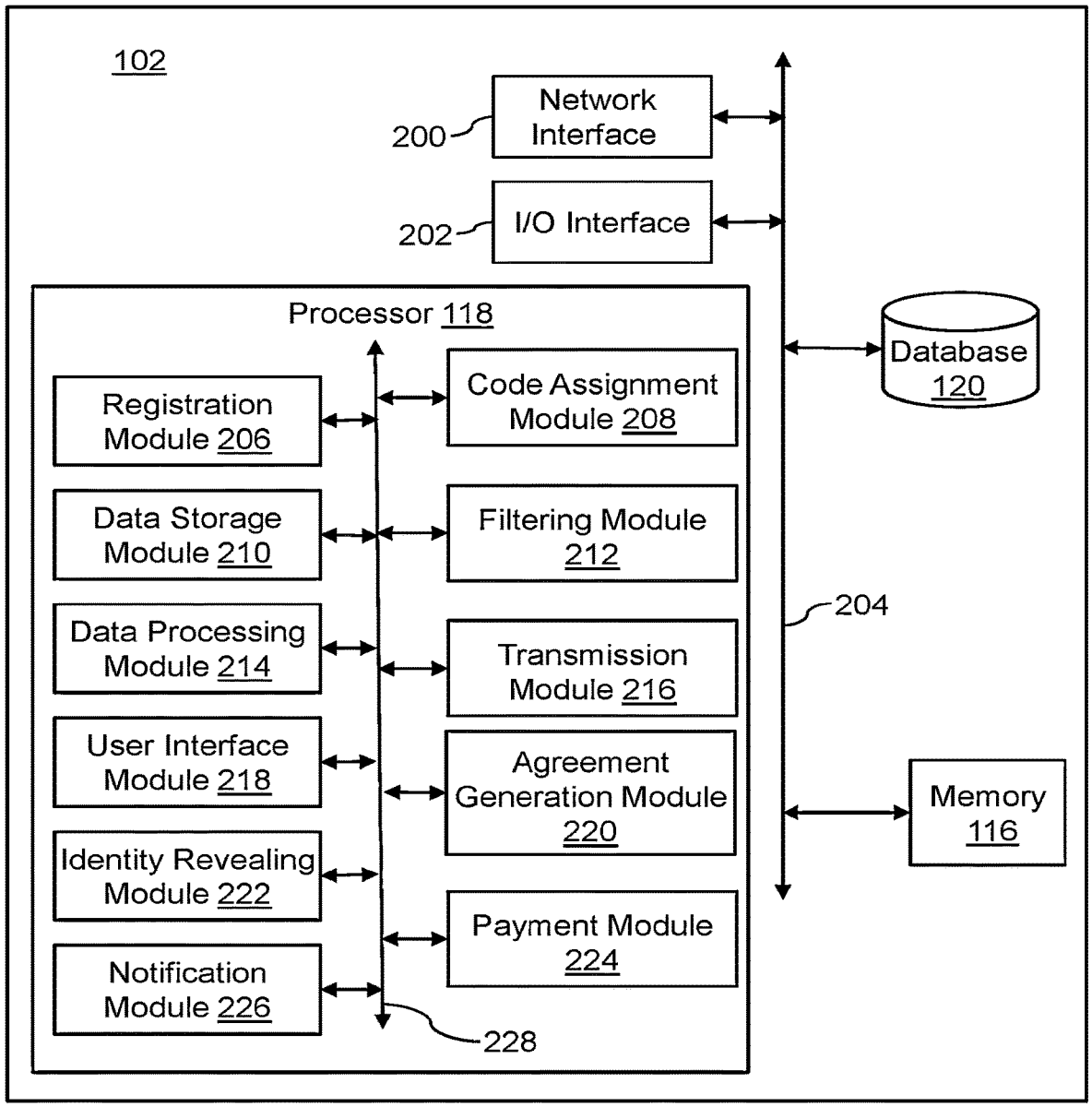
FIG. 2 illustrates components of a server of the system, according to an embodiment of the present invention.

FIG. 2 illustrates components of the server 102 of the system 100, according to an embodiment of the present invention. The server 102 may include the memory 116, the processor 118, and the database 120. The server 102 may further include a network interface 200 and an input/output (I/O) interface 202. The memory 116, the processor 118, the database 120, the network interface 200, and the input/output (I/O) interface 202 may communicate with each other by way of a first communication bus 204. The processor 118 may include, but not limited to, a registration module 206, a code assignment module 208, a data storage module 210, a filtering module 212, a data processing module 214, a transmission module 216, a user interface module 218, an agreement generation module 220, an identity revealing module 222, a payment module 224, and a notification module 226 that communicate with each other by way of a second communication bus 228. The data storage module 210, in various embodiments, can store the data clusters of the quotations, prices, and availability of services that can be atomized by the system 100. It will be apparent to a person having ordinary skill in the art that the server 102 is for illustrative purposes and not limited to any specific combination of hardware circuitry and/or software.

The I/O interface 202 may include suitable logic, circuitry, interfaces, and/or codes that may be configured to receive inputs (e.g., orders) and transmit server outputs via a plurality of data ports in the server 102. The I/O interface 202 may include various input and output data ports for different I/O devices. Examples of such I/O devices may be, but not limited to, a touch screen, a keyboard, a mouse, a joystick, a projector audio output, a microphone, an image-capture device, a Liquid Crystal Display (LCD) screen and/or a speaker.

The processor 118 may be configured to perform operations associated with the system 100 by way of a registration module 206, a code assignment module 208, a data storage module 210, a filtering module 212, a data processing module 214, a transmission module 216, a user interface module 218, an agreement generation module 220, an identity revealing module 222, a payment module 224, and a notification module 226. The algorithm of the present invention can configure the processor 118 to enable the data storage module 210, filtering module 212, and data processing module 214 to perform more efficiently than similar components of other computing systems. The algorithm of the present invention can assist the data storage module 210 with the atomization of the quotations, prices of the goods and services, and availability of the goods and services. Moreover, the algorithm of the present invention can enable the storage module 210 to store all the registered service providers based on the attributes or products of the registered service providers to enable the registered service providers to be found more efficiently in comparison to other computing systems and/or process to enhance commerce. The registered service providers associated with the same product or attribute can all be stored separately from other unlike registered service providers. The registered service providers can be atomized into a specific data cluster like the quotations, prices, identity and availability of goods and services. The algorithm of the present invention can also enable the filtering module 212 to filter out content that is not in a specific format to enable the computing system to run the entire process more efficiently. The algorithm of the present invention can also enable the data processing module 214 computationally produce more efficiently the quotations requested by the consumers.

The registration module 206 may be configured to enable the service providers to register into the system 100 using the e-commerce application (not shown). In an embodiment of the present invention, the e-commerce application such as the e-commerce application 110 may be installed on the corresponding service provider device 104. The registration module 206 may be configured to enable the service providers to register into the system 100 by providing a first set of registration details. The registration module 206 may be configured to enable each of the service providers to register into the system 100 as a trusted service provider. The first set of registration details may include attributes such as, but not limited to, a business name, an official address, a phone number, bank account details, a type of business, a list of goods and/or service provided, a geographical location, and so forth. All of the registered trusted service providers can also be atomized into a single data cluster and can also be represented by a single query expression. Further, the type of business may be, but not limited to, an automobile business, real estate business, mortgage business, clothes business, electronics business, and so forth. Embodiments of the present invention are intended to include or otherwise cover any type of the business. Embodiments of the present invention are intended to include or otherwise cover any type of the first set of registration details that may enable the service providers to register into the system 100. Upon registration, each of the registered service providers may become a member of a Trusted Dealer Network (TDN) that may be a network of the registered service providers in the system 100, in an embodiment of the present invention. Further, the registration module 206 may be configured to enable each of the registered service providers to generate a unique identifier and a password. The registration module 206 may be configured to enable each of the registered service providers to use the generated unique identifier and the password that may include, but not limited to, a fingerprint, a face recognition, retina, etc. to login into the system 100, according to an embodiment of the present invention. Embodiments of the present invention are intended to include or otherwise cover any type of password to securely log-in into the e-commerce application 110. In an embodiment of the present invention, the registration module 206 may be configured to provide the first set of registration details of each of the registered service providers (hereinafter referred to as the first set of registration details) to the code assignment module 208. Furthermore, the registration module 206 may be configured to provide the first set of registration details, the generated unique identifier and the generated password to the data storage module 210.

The registration module 206 may further be configured to enable the consumer to register into the system 100 using the e-commerce application 110. The e-commerce application 110 may be installed on the consumer device 106. The registration module 206 may be configured to enable the consumer to register into the system 100 by providing a second set of registration details, in an embodiment of the present invention. The second set of registration details may be, but not limited to, a name, an address, a gender, a contact number, a date of birth in a pre-defined format, an electronic mail address, and so forth. Embodiments of the present invention are intended to include or otherwise cover any type of the second set of registration details that may enable the consumer to register into the system 100.

Further, the registration module 206 may be configured to enable the consumer to generate the consumer identifier and the passcode for example, but not limited to, the fingerprint, the face recognition, the retina, and so forth, which may be used by the consumer to login into the system 100, according to an embodiment of the present invention. Embodiments of the present invention are intended to include or otherwise cover any type of passcode to securely log-in into the e-commerce application 110. In an embodiment of the present invention, the registration module 206 may also be configured to enable the consumer to initiate the goods and/or services request using the e-commerce application 110. In an embodiment of the present invention, the registration module 206 may be configured to enable the consumer to initiate the goods and/or the services request by providing data such as, but not limited to, a name of the goods and/or service, the geographical location, goods acquisition preferences, a total down payment that the consumer can pay, and so forth. In an embodiment of the present invention, the goods acquisition preferences may be, but not limited to, buying the goods, leasing the goods, and so forth. Embodiments of the present invention are intended to include or otherwise cover any type of the goods acquisition preferences. Embodiments of the present invention can also include an atomization of goods acquisition preferences. There can be a data cluster and query expression for the goods acquisition preferences. Embodiments of the present invention are intended to include or otherwise cover any type of the data that may enable the consumer to initiate the goods and/or services request.

Furthermore, the registration module 206 may be configured to provide the second set of registration details of the consumer (hereinafter referred to as the "second set of registration details") and the goods and/or services request of the consumer to the code assignment module 208. The registration module 206 may also be configured to provide the second set of registration details, the generated consumer identifier, and the generated passcode to the data storage module 210, according to an embodiment of the present invention.

The code assignment module 208 may be configured to generate an anonymous service provider code for each of the registered service providers, based on the received first set of registration details. The anonymous service provider code may be a unique code that may include a Quick Response (QR) code, in an embodiment of the present invention. In another embodiment of the present invention, the anonymous service provider code may be a barcode. In yet another embodiment of the present invention, the anonymous service provider code may be an identification code that may be having, but not limited to, alphabetic characters, numerical characters, alphanumeric characters, a combination of alphanumeric characters and symbols, or a combination thereof. In an exemplary scenario, the anonymous service provider code may comprise elements such as, a combination of, first two letters of the electronic mail address of the service provider, a special symbol and first four digits of the phone number of the service provider. Embodiments of the present invention are intended to include or otherwise cover any type of anonymous service provider code. Further, the code assignment module 208 may be configured to assign the generated anonymous service provider code to each of the corresponding registered service providers.

In an embodiment of the present invention, the code assignment module 208. may be configured to generate an anonymous consumer code for the registered consumer. The code assignment module 208 may be configured to generate the anonymous consumer code for the registered consumer based on the received second set of registration details, the goods and/or services request of the consumer, or a combination thereof. In an embodiment of the present invention, the anonymous consumer code may be a unique code that may be the Quick Response (QR) code. In another embodiment of the present invention, the anonymous consumer code may be the barcode. In yet another embodiment of the present invention, the anonymous consumer code may be the identification code that may be having the alphabetic characters, the numerical characters, the alphanumeric characters, the combination of the alphanumeric characters and the symbols, or a combination thereof. In an exemplary scenario, the anonymous consumer code may comprise a combination of, a first name of the consumer, a special symbol and a year of birth of the consumer. Embodiments of the present invention are intended to include or otherwise cover any type of anonymous consumer code. Further, the code assignment module 208 may be configured to assign the generated anonymous consumer code to the corresponding registered consumer. In an embodiment of the present invention, the code assignment module 208 may be configured to provide the generated anonymous service provider code and the generated consumer code to the data storage module 210.

In an embodiment of the present invention, the data storage module 210 may be configured to store the first set of registration details, based on the attributes of each of the registered service providers in the database 120. The algorithm of the present invention can enable the data storage module 210 to be configured to organize and store information more efficiently than storage modules of other computing systems. Information is stored based on attributes of each registered service providers to enable the computing system to store and process information on the registered service providers more efficiently. The registered service providers are organized in the data storage module 210 based on the attributes of the registered storage module 210. As such, it is easier for the user to more efficiently locate the desired registered service provider. In other embodiments, the storage of the registered service providers can occur based on more than one category. As such, in an embodiment of the present invention, the data storage module 210 may be configured to categorize the registered service providers into one or more categories before storing the first set of registration details into the database 120. The data storage module 210 may be configured to categorize the registered service providers into the categories based on the attributes of each of the registered service providers. As mentioned above, various data on the registered service providers, quotations of prices, actual prices of the goods and services, and availability of the services can be atomized. Data clusters can represent each. Further, a query expression can also represent each subject area for the registered service providers, quotations of prices, actual prices of goods and services, and the availability of the goods and services. The attributes of each of the registered service providers may be, but not limited to, the geographical location, the type of business, and so forth. Embodiments of the present invention are intended to include or otherwise cover any type of the attributes. In an exemplary scenario, if a first list of service providers of the registered service providers (hereinafter referred to as the first list of service providers) belongs to a clothing business, then the data storage module 210 may be configured to store the first set of registration details of the first list of service providers in a first table of the database 120. Based on clothing, the registered service providers can be stored. The user can find the registered service providers more efficiently because they are stored together in comparison to other computing systems. The registered service providers can be atomized as described above. Further, if a second list of service providers of the registered service providers (hereinafter referred to as the second list of service providers) belongs to the automobile business, then the data storage module 210 may be configured to store the first set of registration details of the second list of service providers in a second table of the database 120. In the second table of the database 120, the user can find the registered service providers based on automobiles, as the registered service providers can be atomized into data clusters based on subject area. Further, the registered service providers can also be stored together based on the style of automobile such as sports cars, or family-sized sedans. As such, the user can more easily locate the registered service providers in relation to automobiles in the present computing system due to the registered service providers specifically being stored together based on being automobiles or being a particular brand or style of automobiles identified as a result of the within system and/or process.

In another embodiment of the present invention, the data storage module 210 may be configured to store the first set of registration details in the database 120 without categorizing the registered service providers. Further, the data storage module 210 may be configured to store the generated unique identifier and the generated password of each of the registered service providers in the corresponding table of the database 120. The unique identifier and generated password can be atomized into a data cluster and be represented by a query expression. In an embodiment of the present invention, the data storage module 210 may be configured to store the anonymous service provider code of each of the registered service providers against the first set of registration details in the database 120.

The data storage module 210 may be configured to store the second set of registration details, the goods and/or services request, the generated consumer identifier and the generated passcode of the consumer in the database 120, according to embodiments of the present invention. The second set of registration details can be atomized into a data cluster with a corresponding query expression as well. In an embodiment of the present invention, the data storage module 210 may be configured to store the generated anonymous consumer code against the second set of registration details and the goods request and/or the service request of the consumer in the database 120.

The filtering module 212 may be configured to filter the first set of registration details of each of the registered service providers stored in the database 120. In such embodiment of the present invention, the filtering module 212 may be configured to filter the first set of registration details for generating a list of filtered service providers, based on the defined or specified requested goods and/or the services of the consumer. In the present computing system, the algorithm of the present invention can enable the filtering module 212 to filter unwanted content, unlike similar modules in other computing systems. the filtering module 212 can ensure that only registration details that are stored in a categorized format are stored. Moreover, the filtering module 212, unlike other computing systems, can ensure that only registration details in the desired and categorized format are stored. Using the registration details in the categorized format can improve the speed and efficiency of the computational process. In an embodiment of the present invention, the filtering module 212 may be configured to filter the first set of registration details, if the first set of registration details are not stored in a categorized format. Further, in an embodiment of the present invention, the transmission module 216 may be configured to transmit the goods request and/or the service request of the consumer along with the anonymous consumer code to the list of filtered service providers on the corresponding service provider device 104 through the network 108.

Unlike filtering mechanisms in other computing systems, the algorithm of the present invention enables the filtering module 212 within the processor 118 to be configured to first identify if the requested goods or service are available. To make the computational process more efficient, the filtering module 212 can be configured to generate a quotation transmission notification signal based on a determination based on whether the goods and/or services are available. The computational process can only proceed forward with the goods and/or services that are available. Unlike other computing systems, unnecessary time may not be wasted in going through every potential good or service that are not available and may not be available. In an embodiment of the present invention, the filtering module 212 may be configured to check the list of filtered service providers for an availability of the defined or specified requested goods and/or the service based on the data such as, but not limited to, the geographical location provided by the consumer in the initiated goods and/or services request. Further, the filtering module 212 may be configured to generate a quotation transmission notification signal based on the availability of the defined or specified requested goods and/or services with the list of the filtered service providers. The filtering module 212 may further be configured to transmit the generated quotation transmission notification signal to the notification module 226.

The notification module 226 may be configured to generate a quotation transmission notification based on the received quotation transmission notification signal. Further, the notification module 226 may be configured to transmit the generated quotation transmission notification to a list of filtered service providers for enabling the service providers to provide the quotations for the requested goods and/or services. The list of filtered service providers may provide the quotations using the corresponding service provider device 104 over the network 108 to the data processing module 214. The privacy of the consumer can be protected by the computing system and unlike other computing systems. A consumer can receive quotes or an itemized sticker anonymously. As such, in an exemplary scenario involving the sale of an automobile, the list of filtered service providers may transmit an itemized window sticker along with the quotations for an anonymous consumer's consideration. In an embodiment of the present invention, a number of the services providers in the list of filtered service providers may be, one, two, three, and so forth. In such embodiment of the present invention, the number of the services providers in the list of filtered service providers may vary depending on the data provided by the consumer in the goods and/or the service request.

The data processing module 214 may be configured to receive the quotations associated with the requested goods and/or services from the lists of filtered service providers through the network 108. The data processing module 214 configured within the processor 118 is also configured to compute more efficiently than processing modules in other computing systems. The algorithm of the present invention can enable the data processing module 214 to determine which sorting technique can produce the most efficient result based on a bubble sorting technique or quick sorting technique. Before selecting the sorting technique, the data processing module 214 will identify and determine which sorting technique will be more efficient for the computing system. After identifying which sorting technique will be most efficient for the computing system, the data processing module 214 will identify and select the more efficient sorting technique. In other words, the sorting technique which produces the most efficient result can be chosen. Accordingly, the data processing module 214 may be configured to process the quotations by using a sorting technique determined to be the most efficient sorting technique by the data processing module 214, according to an embodiment of the present invention. The sorting technique may be, but not limited to, a bubble sorting technique, a quick sorting technique, and so forth. As mentioned above, the sorting technique that provides the most efficient sorting or organization for the computational system can be chosen. Embodiments of the present invention are intended to include or otherwise cover any type of sorting technique.

The data processing module 214 can also function more efficiently than processing modules of other computing systems in terms of processing final received quotations. The data processing module 214 can determine which processing order can be the most efficient means to process the corresponding quotations. As such, the data processing module can process the received quotations based on determining whether the increasing order or decreasing order would be the most efficient order to process the received quotations. Based on this determination, in an embodiment of the present invention, the data processing module 214 may be configured to process the received quotations to sort the final all-inclusive price and/or the out the door leasing price, interchangeably referred to as the out the door purchase price and out the door lease price respectively, mentioned in the corresponding quotations of the requested goods and/or service in an increasing order. In another embodiment of the present invention, the data processing module 214 may be configured to process the received quotations to sort the out the door purchase and/or the out the door leasing price of the requested goods and/or services in a decreasing order. In another embodiment of the present invention, the data processing module 214 may be configured to process the received quotations to sort the out the door purchase price, out the door leasing price and/or applicable payment plan for the requested goods and/or services in any order. Further, the data processing module 214 may be configured to identify search results comprising a list of out the door purchase and/or leasing prices from the sorted list of out the door purchase and/or leasing prices. In an embodiment of the present invention, the search query may be configured to return one or more price quotations. In a preferred embodiment of the present invention, the search query is configured to return three price quotations. The data processing module 214 may be configured to provide the received quotations and the sorted list of the out the door purchase and/or leasing prices to the transmission module 216.

The transmission module 216 may be configured to provide the quotations that may be associated with the requested goods and/or services to the user interface module 218, in an embodiment of the present invention. The transmission module 216 may further be configured to provide the sorted list of the out the door purchase and/or leasing prices of the requested goods and/or services to the user interface module 218, in an embodiment of the present invention.

The algorithm of the present invention can configure the user interface module 218 to customize the e-commerce application 110 based on a type of a user, i.e., whether the user is the consumer or the service provider. In an exemplary scenario, the user interface module 218 may customize the e-commerce application 110 for the consumer, in which the consumer may search for the desired goods or services in a specific location, receive the quotations from the service providers, and so forth. In addition, the user interface module 218 may customize the e-commerce application 110 for the service provider to provide the quotations for the requested goods and/or services, and so forth.

The user interface module 218 may further be configured to display the received quotations and the sorted list of out the door purchase and/or leasing pricing onto the user interface 114 of the consumer device 106. The user interface module 218 may further be configured to enable the consumer to select a service provider from the list of filtered service providers displayed on the user interface 114 of the consumer device 106. The user interface module 218 may be configured to enable the consumer to select the service provider having one of the quotations matched with a requirement of the requested goods and/or services of the consumer. In an embodiment of the present invention, the consumer may select the service provider based on the sorted list of out the door purchase price, leasing price and/or applicable payment plan for the requested goods and/or services.

In an embodiment of the present invention, if the user interface module 218 determines that the consumer selects the service provider from the list of filtered service providers, then the user interface module 218 may be configured to generate a first notification signal. The user interface module 218 may further be configured to transmit the generated first notification signal to the notification module 226.

In an embodiment of the present invention, the notification module 226 may be configured to generate a first notification based on the received first notification signal.

The notification module 226 may be configured to transmit the generated first notification to the service provider device 104 of the selected service provider. In another embodiment of the present invention, if the user interface module 218 determines that the consumer rejects the quotations provided by the list of filtered service providers, then the user interface module 218 may be configured to enable the consumer to make changes in the data provided at a time of requesting the goods and/or services.

Further, the user interface module 218 may be configured to enable the selected service provider to initiate a first request based on the received first notification. The first request may be a request of credit and/or financial information such as, but not limited to, a credit application, a cash flow statement, a balance sheet, and so forth of the consumer, in an embodiment of the present invention. Embodiments of the present invention are intended to include or otherwise cover any type of the credit and/or financial information. In an embodiment of the present invention, the credit and/or financial information may be required by the selected service provider to perform credit checks of the consumer. In another embodiment of the present invention, the first request may be a deal acceptance request.

When the user interface module 218 determines that the credit and/or financial information is required by the selected service provider based on the request of the credit and/or financial information of the first request, then the user interface module 218 may be configured to generate an information transmission signal. The user interface module 218 may be configured to transmit the generated information transmission signal to the transmission module 216.

The transmission module 216 may be configured to transmit the credit and/or financial information to the service provider device 104 of the selected service provider. In such embodiment of the present invention, the transmission module 216 may be configured to transmit the credit and/or financial information if the credit and/or financial information of the corresponding consumer is stored in the database 120. In another embodiment of the present invention, if the user interface module 218 determines that the credit and/or financial information is required by the selected service provider, then the user interface module 218 may be configured to generate an information request transmission signal. The user interface module 218 may be configured to transmit the generated information request transmission signal to the transmission module 216.

The transmission module 216 may be configured to transmit the request of the credit and/or financial information of the first request to the consumer device 106 of the corresponding consumer. In such embodiment of the present invention, the transmission module 216 may be configured to transmit the request of the credit and/or financial information of the first request if the credit and/or financial information of the corresponding consumer is not stored in the database 120. Further, in an embodiment of the present invention, the user interface module 218 may be configured to enable the consumer to disclose the credit and/or financial information. In such embodiment of the present invention, the consumer may disclose the credit and/or financial information based on the received request of the credit and/or financial information of the first request.

When the user interface module 218 determines that the credit and/or financial information is disclosed by the consumer and approved by the service provider, then the user interface module 218 may be configured to generate an agreement generation signal. The user interface module 218 may be configured to transmit the generated agreement generation signal to the agreement generation module 220.

The agreement generation module 220 may be configured to generate an agreement having a plurality of details including, but not limited to, the terms and conditions provided by the selected service provider, the name of the consumer, a name of the selected service provider, a signature column for both the consumer and the selected service provider, a consumer and provider selected delivery date and so forth. Embodiments of the present invention are intended to include or otherwise cover any type of the plurality of details.

Further, the user interface module 218 may be configured to display the generated acceptance and/or agreement on the user interface 114 of the consumer device 106. In yet another embodiment of the present invention with respect to the sale of an automobile, the agreement may be finalized on-line or in person. In an embodiment of the present invention, the user interface module 218 may also be configured to display the generated agreement on the service provider device 104 of the selected service provider. In an embodiment of the present invention, the user interface module 218 may be configured to enable the consumer and the selected service provider to sign the agreement generated by the agreement generation module 220 for finalizing the deal, upon selection of one of, the quotations provided by the selected service provider. The user interface module 218 may be configured to generate a deal finalizing signal, when the consumer and the selected service provider sign the agreement. The user interface module 218 may be configured to transmit the generated deal finalizing signal to the identity revealing module 222.

In another embodiment of the present invention, if the user interface module 218 determines that the credit and/or financial information is not required by the selected service provider based on the received deal acceptance request of the first request, then the user interface module 218 may be configured to generate the agreement generation signal and transmits the generated agreement or acceptance generation signal to the agreement generation module 220.

Further, in an embodiment of the present invention, the identity revealing module 222 may be configured to transmit a real identity of the consumer to the service provider device 104 of the selected service provider through the network 108. The real identity of the consumer may comprise the data of the consumer that may be stored in the database 120. In such embodiment of the present invention, the real identity of the consumer may be revealed so that the selected service provider may perform credit checks of the consumer, perform finalization of a requisite paperwork, and so forth. The identity revealing module 222 may also be configured to transmit a real identity of the selected service provider to the consumer device 106 through the network 108, in an embodiment of the present invention.

In an embodiment of the present invention, the payment module 224 may be configured to enable the consumer to make a payment for the requested goods and/or services within a pre-set time frame, upon revealing the real identity of the selected service provider and the consumer. The pre-set time frame may be, but not limited to, 5 minutes, 10 minutes, 30 minutes, an hour, and so forth. The payment module 224 may be configured to enable the consumer to make the payment or deposit by selecting one of, a payment method provided in the quotation of the selected service provider. The payment method may be an offline payment method or an online payment method. The online payment method may be, but not limited to, a credit card payment, a debit card payment, an electronic wallet payment, and so forth. Embodiments of the present invention are intended to include or otherwise cover any type of online payment method. In a preferred embodiment of the present invention, where multiple payments are required, such as a multiple year loan or lease as relating to the purchase of the automobile, the payment module 224 may accept one initial deposit or down payment with the remaining payments coordinated with the product and/or service provider.

Further, in an embodiment of the present invention, the payment module 224 may be configured to generate a second notification signal upon completion of the payment by the consumer. In such embodiment of the present invention, the payment module 224 may be configured to transmit the generated second notification signal to the notification module 226. In another embodiment of the present invention, the payment module 224 may generate a third notification signal in case the credit information is not confirmed as provided or the payment fails. In such embodiment of the present invention, the payment module 224 may be configured to transmit the generated third notification signal to the notification module 226.

In an embodiment of the present invention, the notification module 226 may be configured to generate a second notification based on the received second notification signal. The notification module 226 may be configured to transmit the second notification to a computing device of a delivery agent through a communication means to collect the requested goods from the official address of the service provider and delivers it to the consumer. In such embodiment of the present invention, the notification module 226 may also be configured to transmit information associated with the delivery agent to the consumer device 106 of the consumer. The information may be, but not limited to, a name of the delivery party or entity, a date and time of goods delivery, a contact information of the delivery party or entity, and so forth. Embodiments of the present invention are intended to include or otherwise cover any type of the information that may be associated with the delivery agent. In another embodiment of the present invention, the notification module 226 may be configured to transmit the second notification to the consumer device 106 through the communication means to inform the consumer to collect the requested goods from the official address of the selected service provider. In yet another embodiment of the present invention, the notification module 226 may be configured to transmit the second notification to the service provider device 104 of the selected service provider to inform the selected service provider to deliver the requested goods and/or services.

Similarly, in case of the requested service, the notification module 226 may be configured to transmit the second notification to the computing device of the delivery agent through the communication means to reach at the address of the consumer to provide the requested goods or service, in an embodiment of the present invention. In another embodiment of the present invention, the notification module 226 may be configured to transmit the second notification to the consumer device 106 through the communication means to reach at the official address of the selected service provider for getting the requested service. In yet another embodiment of the present invention, the notification module 226 may be configured to transmit the second notification to the service provider device 104 of the selected service provider to inform the selected service provider of the address of the consumer to provide the requested goods and/or services. The communication means may be, but not limited to, a Short Message Service (SMS), an electronic mail (e-mail), a pop-up, a text message, and alike. Embodiments of the present invention are intended to include or otherwise cover any type of communication means.

Further, in an embodiment of the present invention, the notification module 226 may be configured to generate a third notification based on the received third notification signal. The notification module 226 may be configured to transmit the third notification to the service provider device 104 of the selected service provider. In an embodiment of the present invention, upon receiving the third notification, the selected service provider may issue a notice against the consumer to pay a partial and/or complete amount within a pre-defined period of time. In another embodiment of the present invention, the selected service provider may generate a second request on the server 102 to block the corresponding consumer from the server 102 due to payment issues.

In an embodiment of the present invention, the notification module 226 may be configured to generate a fourth notification in case the selected service provider fails to provide the goods and/or services, upon completion of the payment. In such embodiment of the present invention, the notification module 226 may be configured to transmit the generated fourth notification to the consumer device 106 of the corresponding consumer. Upon receiving the fourth notification, the consumer may generate a third request on the server 102 to block the selected service provider from the server 102, in an embodiment of the present invention. In another embodiment of the present invention, the consumer may generate a refund request on the server 102 to get a full refund of the payment.

Figure 3:
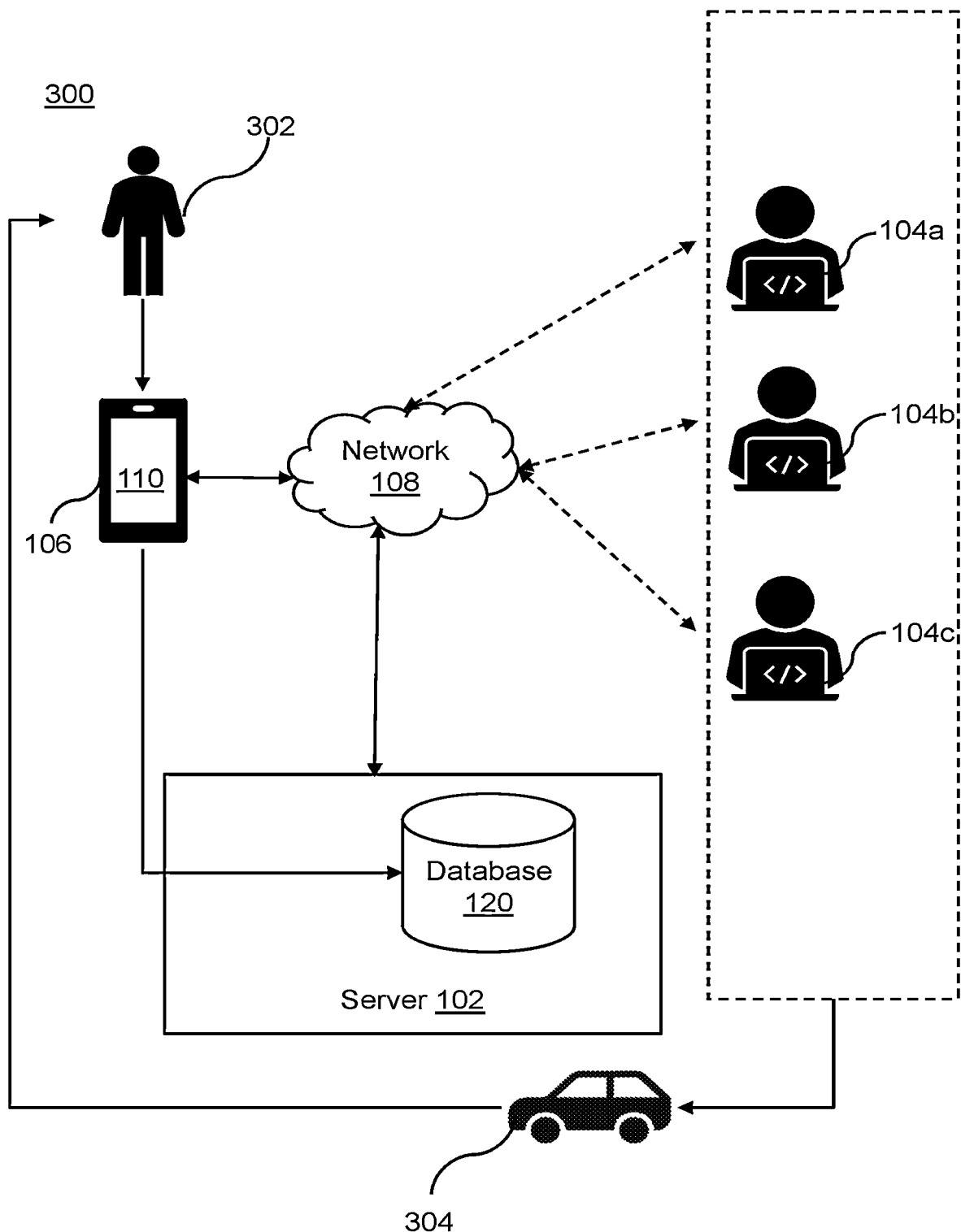
FIG. 3 illustrates an exemplary environment for purchasing and/or leasing an automobile, according to an embodiment of the present invention.

FIG. 3 illustrates an exemplary environment 300 for purchasing and/or leasing an automobile. A prospective consumer 'X' 302 may register with the e-commerce application 110 that may be installed within the consumer device 106 such as, the mobile device, using the registration module 206. Upon registration, the consumer 'X' 302 may provide a request for the purchase or lease of a car 304 by the registration module 206 on the server 102 by using the e-commerce application 110. The request for the car 304 may comprise a geographical location such as, a 'Y' location, a date and time, and a duration of the lease. Upon receiving the request for the car 304, an anonymous consumer code such as, 'ABDYP' may be assigned to the consumer 'X' 302 by the code assignment module 208.

Further, the anonymous consumer code of the consumer 'X' 302 and the request for the car 304 may be stored in the database 120, by the data storage module 210. Further, the request for the car 304 along with the anonymous consumer code may be transmitted, by the transmission module 216, to a list of service providers such as, 'A', 'B' and 'C' having the type of business as the automobile business, where the list of service providers may be registered on the server 102 by using their corresponding service provider devices 104a-104c. The list of service providers such as, 'A', 'B' and 'C' may check for the availability of the requested car 304 at the 'Y' location, the date and time, and for the duration of the lease. The list of service providers, both a first and a second set, preferences, quotations, and availability can all be atomized when stored. As such, each can be represented by a query expression. The list of service providers such as, A', 'B' and 'C' may then transmit the availability and specific identity of the requested car 304 and the out the door purchase or leasing costs to the server 102 through the network 108 such as, the Internet.

Further, the out the door purchase or leasing costs of the requested car 304 may be sorted, by the data processing module 214, in the increasing or decreasing order. The sorted list of the out the door purchase or leasing costs may be displayed, by the user interface module 218, on the user interface 114 of the consumer device 106. The consumer 'X' 302 would then select, by the user interface module 218, a deal of the service provider 'A' on the consumer device 106 and would then sign the purchase/lease agreement by the service provider 'A' and the consumer 'X' 302. Upon signing the agreement, the data associated with the consumer 'X' 302 having the consumer code 'ABDYP' may be transmitted to the service provider 'A', by the transmission module 216, for payment procedures. Upon completion of the payment, the service provider 'A' may deliver the requested car 304 to the 'Y' location of the consumer 'X' 302 at the desired date and time for the requested duration.

Figure 4:
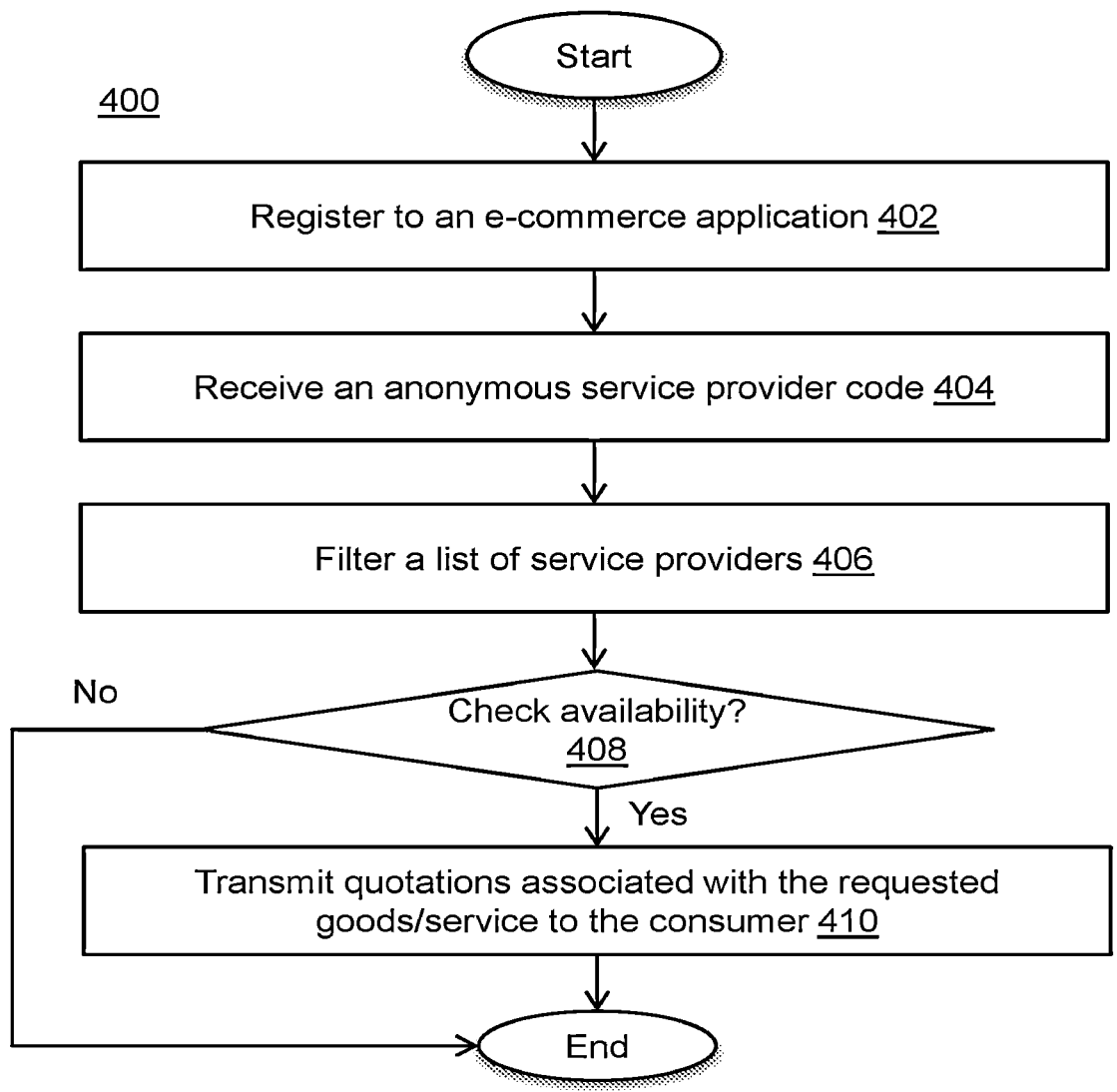
FIG. 4 illustrates a flow chart of a method of facilitating anonymous marketing of goods and/or services by using the system, according to an embodiment of the present invention.

FIG. 4 illustrates a flow chart of a method 400 to facilitate anonymous marketing of goods and/or services by using the system 100, according to an embodiment of the present invention.

At step 402, the system 100 may enable the service providers to register to the e-commerce application installed within the corresponding service provider device 104. The service providers may register to the e-commerce application, such as the e-commerce application 110, by providing the first set of registration details, as discussed above.

At step 404, the system 100 may enable each of the registered service providers to receive the corresponding anonymous service provider code.

At step 406, the system 100 may filter the first set of registration details of each of the registered service providers to generate the list of filtered service providers, based on the goods and/or services request received from the consumer. The first set of registration details can be atomized in at least one embodiment.

At step 408, the system 100 may enable the list of filtered service providers to check for the availability of the requested goods and/or services. The availability can also be atomized in at least one embodiment. The method 400 may proceed to a step 410 if the requested goods and/or services are available with the filtered service providers. Otherwise, the method 400 may conclude.

At the step 410, the system 100 may enable the lists of filtered service providers to transmit the quotations that may be associated with the requested goods and/or services to the consumer according to an embodiment of the present invention. The requested goods and/or services can also be atomized in at least one embodiment.

Figure 5:
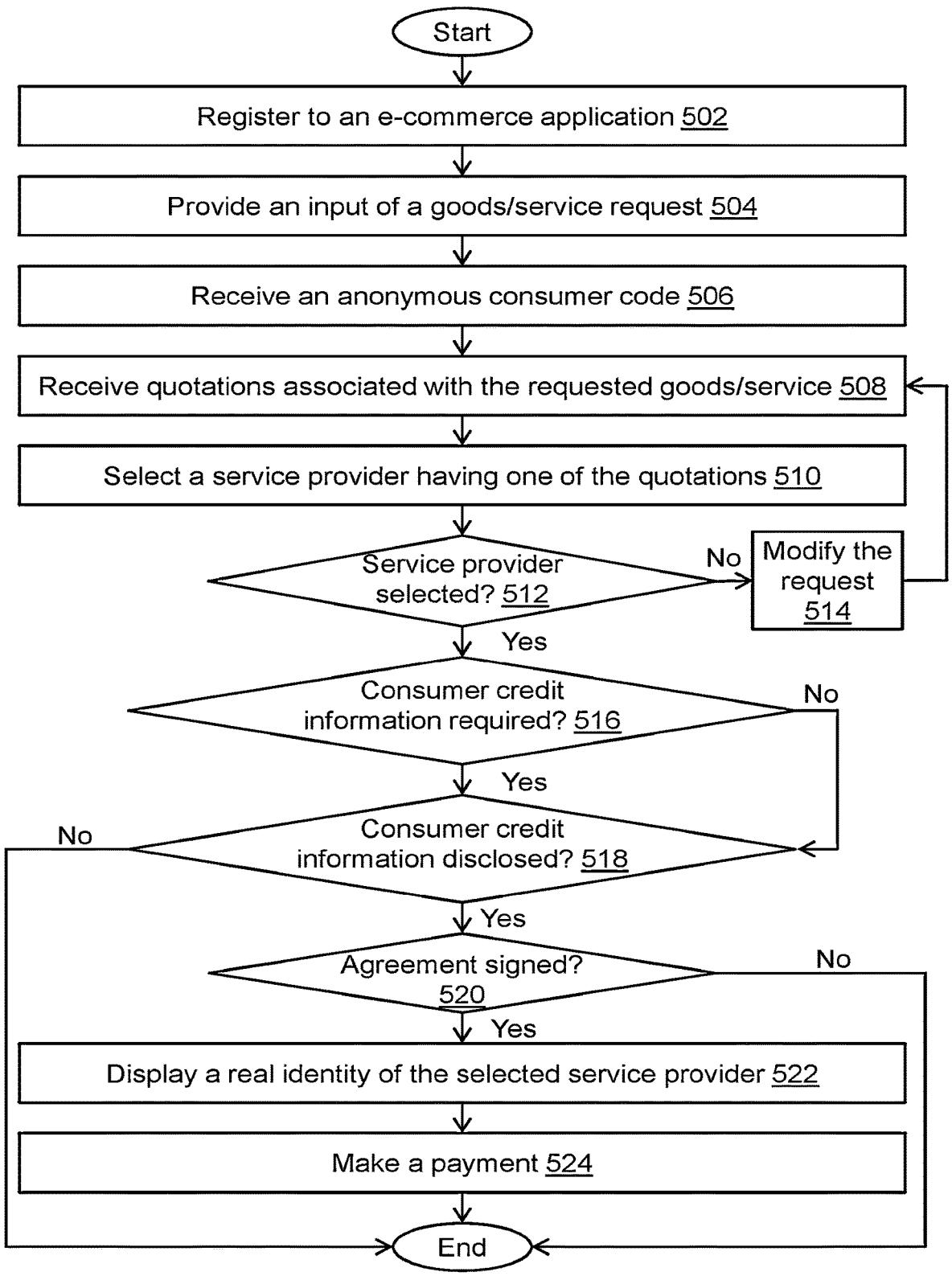
FIG. 5 illustrates a flow chart of a method of facilitating an anonymous purchase of goods and/or services by using the system, according to an embodiment of the present invention.

FIG. 5 illustrates a flowchart of a method 500 of facilitating anonymous trading of goods and/or services by using the system 100, according to an embodiment of the present invention.

At step 502, the system 100 may enable the consumer to register onto the e-commerce application 110 installed within the consumer device 106.

At step 504, the system 100 may enable the consumer to provide the input of the goods request and/or services request, as discussed above.

At step 506, the system 100 may enable the consumer to receive an anonymous consumer code.

At step 508, the system 100 may enable the consumer to receive the quotations that may be associated with the requested goods and/or services from the list of filtered service providers.

At step 510, the system 100 may enable the consumer to select the service provider from the list of filtered service providers having one of, the quotations matched with the requirement of the requested goods and/or services.

At step 512, the system 100 may determine whether one of the services providers from the list of filtered service providers is selected by the consumer or not. In case, the system 100 determines that none of the services providers from the list of filtered service providers is selected by the consumer, then the method 500 may proceed to a step 514. Otherwise, the method 500 may proceed to a step 516.

At the step 514, the system 100 may enable the consumer to make some changes in the request and the method 500 may further return to the step 508.

At step 516, the system 100 may determine whether the credit and/or financial information of the consumer is required by the selected service provider. The method 500 may proceed to a step 518 if the credit and/or financial information of the consumer is required by the selected service provider. Otherwise, the method 500 may proceed to a step 520.

At the step 518, the system 100 may determine whether the credit and/or financial information is adequately disclosed and accepted by the service provider or not. The method 500 may proceed to the step 520 if the credit and/or financial information is adequate and accepted by the service provider. Otherwise, the method 500 may conclude.

At the step 520, the system 100 may determine whether the agreement is signed by the consumer and the selected service provider or not. The method 500 may proceed to a step 522, when both the consumer and the selected service provider signed the agreement or commits to the price offered. Otherwise, the method 500 may conclude.

At the step 522, the system 100 may display the real identity of the selected service provider to the consumer.

At step 524, the system 100 may enable the consumer to make the requisite and/or remaining payment of the requested goods and/or services to the selected service provider.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

The exemplary embodiments of this present invention have been described in relation to a system and method for trading goods and services. However, to avoid unnecessarily obscuring the present invention, the preceding description omits a number of known structures and devices. This omission is not to be construed as a limitation of the scope of the present invention. Specific details are set forth by use of the embodiments to provide an understanding of the present invention. It should however be appreciated that the present invention may be practiced in a variety of ways beyond the specific embodiments set forth herein.

A number of variations and modifications of the present invention can be used. It would be possible to provide for some features of the present invention without providing others.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present invention. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving case and/or reducing cost of implementation.

The foregoing discussion of the present invention has been presented for purposes of illustration and description. It is not intended to limit the present invention to the form or forms disclosed herein. In the foregoing Detailed Description, for example, various features of the present invention are grouped together in one or more embodiments, configurations, or aspects for the purpose of streamlining the invention. The features of the embodiments, configurations, or aspects may be combined in alternate embodiments, configurations, or aspects other than those discussed above. This method of invention is not to be interpreted as reflecting an intention the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present invention. It is intended to obtain rights which include alternative embodiments, configurations, or aspects to the extent permitted, including alternate, interchangeable and/or equivalent structures, functions, ranges or steps to those claimed, whether or not such alternate. interchangeable and/or equivalent structures, functions, ranges or steps are disclosed herein. and without intending to publicly dedicate any patentable subject matter.

What is claimed is:

1. A system for trading goods and services, the system comprising:
  a processor configured with a distributed architecture of modules; and
  a non-transitory computer-readable storage medium storing instructions executable by the processor to cause the system to perform operations comprising:
    registration of service providers and consumers by providing a first set of registration details and a second set of registration details, respectively;
    generating anonymous service provider codes and anonymous consumer codes for the registered service providers and registered consumers, respectively, based on the received first set of registration details and the second set of registration details;
    identifying, by the processor, a level of availability for a requested service;
    filtering the first set of registration details associated with the registered service providers to generate a list of filtered service providers, wherein the processor initially identifies an availability for each of the registered service providers, based on a requested service by a consumer, wherein the processor identifies goods and services from the registered service providers that are available and goods and services that are unavailable, wherein the processor customizes an application for each of the registered service providers to provide purchase price quotations, wherein the processor customizes the application for each type of user including the registered service providers, wherein the processor filters the first set of registration details when the first set of registration details are not stored in a categorized format, wherein the processor filters the service providers based on a location of the service providers and the availability of the requested service and/or requested goods of the filtered service providers, and is configured to store the first set of registration details based on the location and business type of the filtered service providers;
    receiving and sorting purchase price quotations associated with the requested service from the lists of filtered service providers, wherein the processor also transmits an itemized window sticker with the purchase price quotations for an anonymous consumer's consideration;
    applying, by the processor, an internal algorithm to identify a sorting technique with a highest computational efficiency;
      applying, by the processor, the sorting technique with the highest computational efficiency among a plurality of sorting techniques onto the received purchase price quotations, wherein the processor determines using the sorting technique with the highest computational efficiency which processing order, whether in an increasing order, descending order, or in a random order, can be the most efficient means to process the corresponding quotations, and based on this determination, identify three purchase price quotations and process the three identified purchase price quotations to sort a final all-inclusive price in the corresponding quotations of the requested goods and services in the determined processing order;
    providing, by a user interface, a list of the service providers to be selected by the consumer based on the sorted purchase price quotations, wherein the purchase price quotations are atomized into a query expression;
    generating a first notification when the consumer selects a service provider from the list of filtered service providers such that the selected service provider is enabled to initiate a first request based on the first notification; wherein credit and financial information regarding the consumer is approved by the selected services provider to facilitate and agreement; and
    converting the anonymous consumer code and service provider code to transmit a real identity of the consumer to a service provider device associated to the selected service provider such that a payment for the requested service is initiated within a pre-set time frame when the real identity of the selected service provider and the consumer is revealed.

2. The system of claim 1, wherein, each service provider is required to complete the first set of registration details prior to receiving the anonymous service provider code.

3. The system of claim 1, wherein, each consumer is required to complete the second set of registration details prior to receiving the anonymous consumer code.

4. The system of claim 1, wherein the anonymous service provider codes and anonymous consumer codes are selected from the group consisting of, a Quick Response (QR) code, a barcode and an identification code comprising alphabetic and numeric characters.

5. The system of claim 1, wherein the purchase price quotations associated with a requested service are sorted by price and geographic location.

6. The system of claim 1, wherein an operation is performed comprising: storing the first set of registration details based on attributes of each of the registered service providers in a database such that, prior to storing the first set of registration details, the registered service providers are categorized into one or more categories based on the attributes of each of the registered service providers.

7. The system of claim 1, wherein filtering the first set of registration details associated with the registered service providers further comprises filtering the first set of registration details, when the first set of registration details are not stored in a categorized format.

8. The system of claim 1, wherein the first request comprises a request for the financial information of the consumer.

9. The system of claim 7, wherein a purchase agreement is generated upon approval of the financial information by the service provider.

10. A system for trading goods and services, the system comprising:
a processor configured with a distributed architecture of modules;
a non-transitory computer-readable storage medium storing instructions executable by the processor to cause the system to perform operations comprising:
registration of service providers and consumers by providing a first set of registration details and a second set of registration details, respectively;
generating anonymous service provider codes and anonymous consumer codes for each of the registered service providers and registered consumers, respectively, based on the received first set of registration details and the second set of registration details;
identifying, by the processor, a level of availability for a requested service;
filtering a first set of registration details associated with registered service providers to generate a list of filtered service providers, wherein the processor initially identifies an availability for each of the registered service providers, based on a requested service by a consumer, wherein the processor identifies goods and services from the registered service providers that are available and goods and services that are unavailable, wherein the processor customizes an application for each of the registered service providers to provide purchase price quotations, wherein the processor customizes the application for each type of user including the registered service providers, wherein the processor filters the first set of registration details when the first set of registration details are not stored in a categorized format, wherein the processor filters the service providers based on a location of the service providers and the availability of the requested service and/or requested goods of the filtered service providers, and is configured to store the first set of registration details based on the location and business type of the filtered service providers;
receiving purchase price quotations associated with the requested service from the lists of filtered service providers, wherein the price quotations are atomized into a query expression;
applying, by the processor, an internal algorithm to identify a sorting technique with a highest computational efficiency;
applying, by the processor, the sorting technique with the highest computational efficiency among a plurality of sorting techniques to apply onto the received purchase price quotations, wherein the processor determines using the sorting technique with the highest computational efficiency which processing order, whether in an increasing order, descending order, or in a random order can be the most efficient means to processing the corresponding quotations, and based on this determination, identify three purchase price quotations and process the three identified purchase price quotations to sort a final all-inclusive price in the corresponding quotations of the requested goods and services in the determined processing order;
sorting the purchase price quotations based on the applied sorting technique;
providing, by a user interface, a list of the service providers to be selected by the consumer based on the sorted purchase price quotations, wherein the processor also transmits an itemized window sticker with the purchase price quotations for an anonymous consumer's consideration;
generating a first notification when the consumer selects a service provider from the list of filtered service providers such that the selected service provider is enabled to initiate a first request based on the first notification, wherein the first request comprises a request of consumer financial information, wherein credit and financial information regarding the consumer is approved by the selected services provider to facilitate and agreement;
converting the anonymous server provider code and the anonymous consumer code to transmit a real identity of the consumer to a service provider device associated to the selected service provider; and
generating a purchase agreement when the consumer financial information is approved by the selected service provider.

11. The system of claim 10, wherein, the service providers are required to complete the first set of registration details prior to receiving the anonymous service provider code.

12. The system of claim 10, wherein the anonymous service provider codes and anonymous consumer codes are selected from the group consisting of, a Quick Response (QR) code, a barcode and an identification code comprising alphabetic and numeric characters.

13. The system of claim 10, further performs an operation comprising: storing the first set of registration details based on attributes of each of the registered service providers in a database such that the registered service providers are categorized into one or more categories based on the attributes of each of the registered service providers prior to storing the first set of registration details.

14. The system of claim 10, wherein filtering the first set of registration details associated with the registered service providers further comprises filtering the first set of registration details, when the first set of registration details are not stored in a categorized format.

15. The system of claim 10, wherein the purchase price quotations associated with a requested service are sorted by price and geographic location.

16. A computer implemented method for facilitating anonymous trading of goods and services, the method comprising the steps of:

Identifying, by the processor configured with a distributed architecture of modules, an availability of a requested service;

filtering, by way of a processor, a first set of registration details associated with registered service providers to generate a list of filtered service providers, wherein the processor initially identifies an availability for each of the registered service providers based on the requested service by a consumer, wherein the processor identifies goods and services from the registered service providers that are available and goods and services that are unavailable, with both said service providers and consumer each being assigned an anonymous service provider code and an anonymous consumer code respectively, wherein the processor filters the first set of registration details when the first set of registration details are not in a standardized format, and wherein the processor customizes an application for each of the registered service providers to provide price quotations, wherein the processor customizes the application for each type of user including the registered service providers, wherein the processor filters the service providers based on a location of the service providers and the availability of the requested service and/or requested goods of the filtered service providers, and is configured to store the first set of registration details based on the location and business type of the filtered service providers;

receiving, by way of the processor, the price quotations associated with the requested service from the list of filtered service providers, wherein the processor also transmits an itemized window sticker with the purchase price quotations for an anonymous consumer's consideration, wherein the price quotations are atomized into a query expression;

applying, by the processor, an internal algorithm to identify a sorting technique with a highest computational efficiency;

applying, by the processor, the sorting technique with the highest computational efficiency among a plurality of sorting techniques to apply onto the received price quotations, wherein the processor determines using the sorting technique with the highest computational efficiency which processing order, whether in an increasing order, descending order, or in a random order can be the most efficient means to process the corresponding quotations, and based on this determination, identify three purchase price quotations and process the three identified purchase price quotations to sort a final all-inclusive price in the corresponding quotations of the requested goods and services in the determined processing order;

sorting, the price quotations, by way of the processor, based on the applied sorting technique;

providing, by a user interface, a list of the service providers to be selected by the consumer based on the sorted price quotations;

generating, by way of the processor, a first notification when the consumer selects a service provider from the list of filtered service providers such that the selected service provider is enabled to initiate a first request based on the first notification, wherein credit and financial information regarding the consumer is approved by the selected services provider to facilitate and agreement;

converting, by way of the processor, the anonymous service provider code and anonymous consumer code to reveal a real identity of the consumer and selected service provider;

transmitting, by way of the processor, the real identity of the consumer to a service provider device associated with the selected service provider; and processing, by way of the processor, payment for the requested service within a pre-set time frame.

17. The method of claim 16, wherein the anonymous consumer code and anonymous service provider code are selected from the group consisting of, a Quick Response (QR) code, a barcode and an identification code comprising alphabetic and numeric characters.

18. The method of claim 16, further comprising the step of storing, by way of a processor, the first set of registration details based on attributes of each of the registered service providers in a database such that the registered service providers are categorized into one or more categories based on the attributes of each of the registered service providers before storing the first set of registration details.

19. The method of claim 16, wherein the first request comprises a request for the consumer's financial information.

20. The method of claim 19, further comprising a step of generating, by way of the processor, a purchase agreement for the requested service upon acceptance of the consumer's financial information by the selected service provider.

* * * * *